UNITED STATES PATENT OFFICE.

HENRY J. ROSEVELT, OF LITTLE SILVER, NEW JERSEY.

PUTTY.

SPECIFICATION forming part of Letters Patent No. 696,148, dated March 25, 1902.

Application filed June 1, 1901. Serial No. 62,801. (No specimens.)

*To all whom it may concern:*

Be it known that I, HENRY J. ROSEVELT, a citizen of the United States, residing at Little Silver, in the county of Monmouth and State of New Jersey, have invented certain new and useful Improvements in Putty; and I do hereby declare the following to be a full, clear, and exact description of the invention, such as will enable others skilled in the art to which it appertains to make and use the same.

This invention has reference to a new composition of putty.

The invention has for its principal object the production of clear and very pliable putty, which is of a light color and has a glossy appearance when the putty has set or become hardened, and, furthermore, to provide putty which shall become very hard after it has been applied to a window-frame for securing the glass pane in position and is not liable to crack or break when exposed to the changes of temperature. My invention therefore consists, primarily, in the production as a new article of manufacture of putty composed of mineral clay and raw linseed-oil, the preferred mineral clay to be used being that known to the trade as "kaolin."

In carrying out my invention I take mineral clay, and preferably the mineral clay known as "kaolin," and grind the same in a suitable grinding-machine to a fine powder. I next take a sufficient quantity of this finely-ground clay and add thereto a small but sufficient quantity of linseed-oil—say in the proportion of about ninety per cent. of the powdered mineral clay to ten per cent. of the raw linseed-oil. The mineral clay being in its character of an oily nature, it will be found that in producing putty of the proper consistency but a very slight proportion of the raw linseed-oil will have to be added to the powdered mineral clay before thoroughly mixing the clay and the oil in a mixing device or apparatus of any known construction. When the said mineral clay and the raw linseed-oil have been sufficiently mixed, a beautiful putty of a light color and glossy nature will be the production, the same, owing to its extreme oily nature, being very pliable, and when dry after its application to the window-pane or other article will become extremely hard and will not break or crack when exposed to the changes of the weather and temperature.

Having thus described my invention, what I claim is—

As a new article of manufacture, the herein-described putty composition consisting of a mixture of mineral clay and raw linseed-oil, in the proportion of about ninety per cent. of mineral clay to about ten per cent. of linseed-oil, substantially as and for the purposes set forth.

In testimony that I claim the invention set forth above I have hereunto set my hand this 31st day of May, 1901.

HENRY J. ROSEVELT.

Witnesses:
FREDK. C. FRAENTZEL,
GEO. D. RICHARDS.